Figure 1:
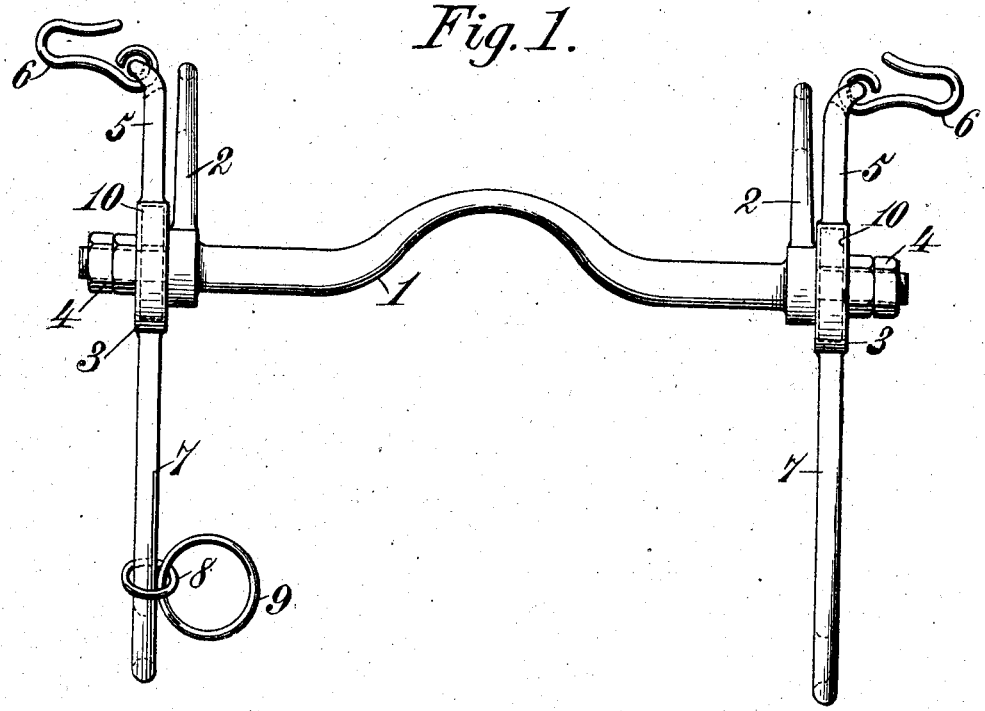

No. 834,236. PATENTED OCT. 23, 1906.
W. KRONHEIM.
HORSE BIT.
APPLICATION FILED FEB. 12, 1906.

2 SHEETS—SHEET 1.

Witnesses.
Robert Everett.
C. M. Sweeney.

Inventor
Wolf Kronheim
By
Atty.

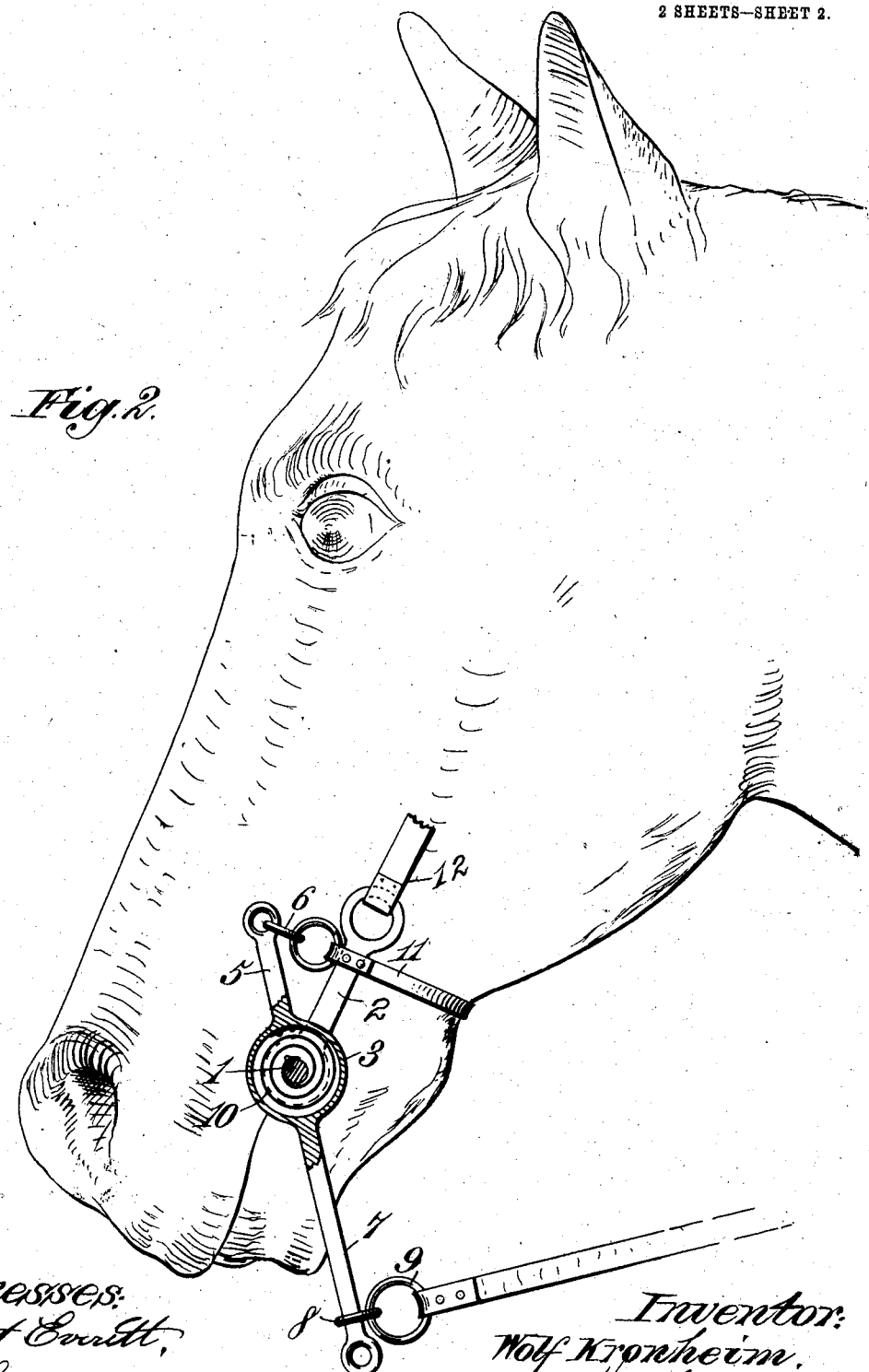

UNITED STATES PATENT OFFICE.

WOLF KRONHEIM, OF HAMBURG, GERMANY, ASSIGNOR TO THE FIRM OF WELT-KANDAREN-FABRIK SIXT & COMPANY, OF HAMBURG, GERMANY.

HORSE-BIT.

No. 834,236.     Specification of Letters Patent.     Patented Oct. 23, 1906.

Application filed February 12, 1906. Serial No. 300,733.

*To all whom it may concern:*

Be it known that I, WOLF KRONHEIM, a subject of the German Emperor, and a resident of Hamburg, Germany, have invented a certain new and useful Improvement in Horse-Bits, of which the following is a specification.

This invention relates to a horse-bit which enables a runaway or unruly animal to be quickly subdued by powerfully pulling the reins without the corners of the animal's mouth being violently pressed.

The invention comprises a bit having a mouth-bar on which are mounted spring side bars, to one end of each of which the curb strap or chain is secured and to the other end of each of which the reins are attached. By pulling the reins the curb strap or chain is gradually pressed against the jaw-bone without the mouth-bar tugging in the mouth.

In the accompanying drawings, to which the following description has reference, Figure 1 is a detail front view of the improved bit; and Fig. 2 is a side view of the same, partly in section, illustrating the operation or use of the invention.

The mouth-bar 1 is provided with the arms 2, by which it is held immovable laterally in the animal's mouth, the bit being suspended from the cheek-straps 12 by means of the said arms 2. Immediately alongside these arms 2 are resiliently secured side bars 7, rotatable around the mouth-bar 1 under the action of spiral springs 10, which are carried in casings 3, secured in place by nuts 4. The said side bars 7 are formed with arms 5, through eyes in which suitable hooks 6 are inserted for attaching the curb-strip 11. Rings 8 9 serve for attaching the reins. By pulling the latter the side bars 7 are turned against the action of the springs in the casings 3 around the axis of the mouth-bar 1, which cannot be displaced laterally in the animal's mouth, and the curb-strap, which is secured to the hooks 6, is thus gradually pressed against the chin.

Having now described my invention, what I claim, and desire to secure by Letters Patent of the United States, is—

The improved horse-bit, comprising the combination of a mouth-bar 1 having lever-arms 2 for the attachment of the cheek-straps and which prevent lateral movement of said mouth-bar in the animal's mouth, side bars 7 having extensions 5 provided with hooks 6 connected with the curb-strap, casings 3 mounted on said mouth-bar, and springs in said casing resiliently connecting said side bars to said mouth-bar, substantially as and for the purpose specified.

In testimony whereof I have signed my name to this specification in the presence of two subscribing witnesses.

WOLF KRONHEIM.

Witnesses:
   ERNEST H. L. MUMMENHOFF,
   OTTO W. HELLMRICH.